(12) United States Patent
Nijim et al.

(10) Patent No.: US 11,234,040 B1
(45) Date of Patent: Jan. 25, 2022

(54) CONTROL SYSTEM THAT INCLUDES A VIRTUAL VERSION OF A REMOTE CONTROL

(71) Applicant: Cox Communications, Inc., Atlanta, GA (US)

(72) Inventors: Yousef Wasef Nijim, Cumming, GA (US); Jenna Meushaun Taneak Smith, Lilburn, GA (US); Megan Walls Dover, Peachtree Corners, GA (US); Anthony Joseph Insinga, Powder Springs, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 16/923,666

(22) Filed: Jul. 8, 2020

(51) Int. Cl.
*H04N 21/422* (2011.01)
*H04N 21/41* (2011.01)
*H04N 21/485* (2011.01)

(52) U.S. Cl.
CPC . *H04N 21/42225* (2013.01); *H04N 21/41265* (2020.08); *H04N 21/485* (2013.01)

(58) Field of Classification Search
CPC ....... H04N 21/42225; H04N 21/41265; H04N 21/485
See application file for complete search history.

(56) References Cited

U.S. PATENT DOCUMENTS

| 6,937,972 | B1 | 8/2005 | Van Ee |
| 7,170,422 | B2 | 1/2007 | Nelson et al. |
| 2004/0119894 | A1 | 6/2004 | Higgins et al. |
| 2009/0251619 | A1 | 10/2009 | Seidel et al. |
| 2010/0060506 | A1 | 3/2010 | Maier |
| 2012/0154689 | A1* | 6/2012 | Lemus ............... H04N 21/4424 348/734 |
| 2018/0139512 | A1* | 5/2018 | Moran .................. G06F 1/1607 |
| 2020/0136892 | A1* | 4/2020 | Rao ......................... H04L 41/22 |

* cited by examiner

*Primary Examiner* — Yassin Alata
(74) *Attorney, Agent, or Firm* — Merchant & Gould P.C.

(57) ABSTRACT

Aspects of the present disclosure provide an agent control system that includes a virtual version of a remote control. In one aspect, the disclosure describes an input history store that stores user input operations corresponding to received user inputs to a remote control located at a subscriber location and an agent controller associated with a service provider that generates a dashboard user interface (UI) that operates in part to display a virtual version of the remote control, one or more of the input operations corresponding to the received user inputs to the remote control at the subscriber location, and/or a recommended action to execute on the virtual version of the remote control. Other aspects are described in detail herein.

20 Claims, 10 Drawing Sheets

CONTROL SYSTEM THAT INCLUDES A VIRTUAL VERSION OF A REMOTE CONTROL

BACKGROUND

Handheld remote controls can be used to control operation of various mated devices, (e.g., televisions, set-top boxes (STBs), digital video recorders (DVRs), digital music players, entertainment centers, Internet of Things (IoT) devices) by wirelessly transmitting control signals to the devices. While labeled as "remote" controls, infrared and radio frequency type remote controls are typically constrained to a physical location due to the limited transmitter power and/or signal characteristics. For example, infrared-based remote controls are typically line of sight devices and require location within the same area as the mated controllable devices. At least one technical problem exists due in part to the passive and constrained nature of remote controls. That is, a remote control passively waits until a user input is received, such as a remote control key press or voice-activated remote control input for example, in order to transmit a control signal from the remote control to a mated device. Moreover, the passive nature of remote controls makes it technically difficult to ascertain whether a remote control is malfunctioning or whether there is user error without physically being with the remote control.

Accordingly, the present disclosure provides at least one technical solution to the technical problems associated with remote control functionality.

SUMMARY

Aspects of the present disclosure disclose a system, method, and computer readable storage media to provide an agent controller that includes a virtual version of a subscriber remote control that enables controlling a network device at the subscriber location via the virtual version of a remote control, but is not so limited. A system of an embodiment includes an input history store that stores user input operations corresponding to received user inputs to a remote control located at a subscriber location and an agent controller associated with a service provider that generates a dashboard user interface (UI) in part to display a virtual version of the remote control, one or more input operations corresponding to the received user inputs to the remote control at the subscriber location, and/or a recommended action to execute on the virtual version of the remote control. A method of an embodiment includes storing user input operations associated with actuation of keys of a remote control being used at a subscriber location, generating a virtual version of the remote control as part of a dashboard UI that displays a layout of the remote control being used at the subscriber location, outputting, via a machine learning engine, a recommended action to execute on the virtual version of the remote control according to the user input operations associated with actuation of keys of the remote control being used at one or more subscriber locations, and/or displaying, via the dashboard UI, the virtual version of the remote control, one or more of the user input operations associated with actuation of keys of the remote control being used at the subscriber location, and the recommended action to execute on the virtual version of the remote control. Other aspects are described in detail herein and the summary provides a brief overview of the technology used and employed.

The details of one or more aspects are set forth in the accompanying drawings and description below. Other features and advantages will be apparent from a reading of the following detailed description and a review of the associated drawings. It is to be understood that the following detailed description is not intended to be restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

Figure 1:
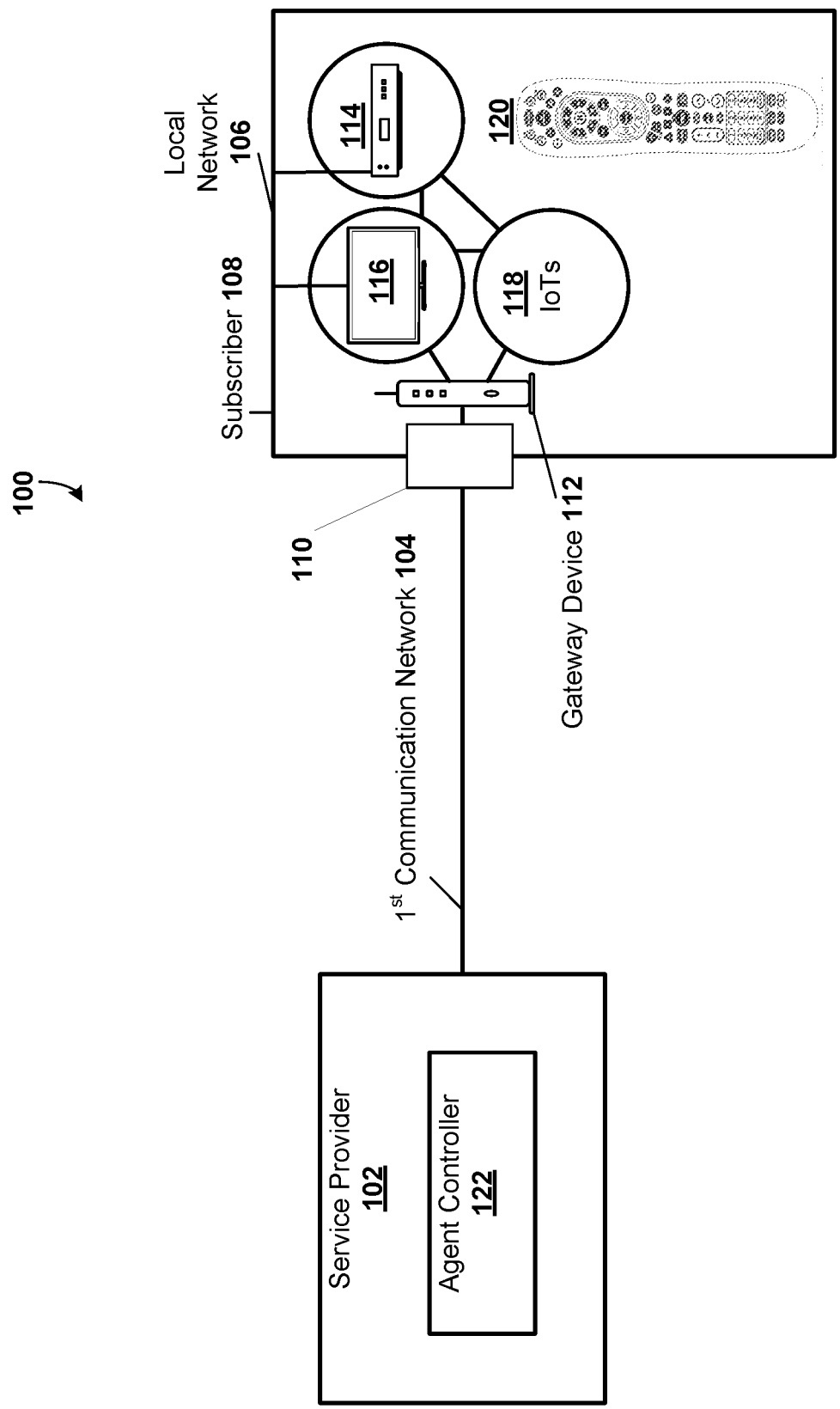
FIG. 1 is a block diagram of an example environment in which aspects of the present disclosure can be implemented.

FIG. 1 is a block diagram of an example communication environment 100 that includes a service provider 102 that provides one or more services (e.g., video, telephony, Internet data, etc.) to a plurality of subscribers (generally 108) over one or a combination of networks (i.e., first communications network 104 and/or local network 106). As an example, a service provider 102 network may include a hybrid fiber coax (HFC) communication infrastructure to provide cable television (CATV), Internet, and/or other services to a subscriber 108 location via a junction 110 that may include one or more filters, amplifiers, splitters, coaxial, etc. that enables signals to be communicated to and from subscriber 108 at the subscriber's location.

As shown in the example environment 100 of FIG. 1, junction 110 located at the location of subscriber 108 enables connection of a gateway device 112, a set-top box (STB) 114, smart television 116, various Internet of Thing (IoT) devices 118, and/or other networked devices that enables the subscriber 108 to access services provided by the service provider 102. A service provider 102 may provide services via communication network 104 to the junction 110 according to a standardized communication protocol. The standardized communication protocol according to which the service provider 102 operates may define upstream and downstream channels to enable bidirectional communications between the service provider 102 and a plurality of subscribers.

Subscriber 108 may utilize equipment (gateway device 112, STB 114, smart television 116, various Internet of Thing (IoT) devices 118, etc.) that can be controlled using one or more remote controls 120. For example, a universal remote control that can be configured to control multiple devices may be mated and used to control one or more of the gateway device 112, STB 114, smart television 116, various Internet of Thing (IoT) devices 118, etc. As described in detail further below, service provider 102 includes an agent controller 122 configured to access a remote control input history store for its subscribers as part of generating a dashboard user interface (UI) (e.g., dashboard UI 600 of FIG. 6) that includes a virtual version of the remote control, a history of input operations input to one or more remote controls located at the subscriber 108 location, and/or recommended action(s) to take to resolve an issue. The agent controller 122 of an embodiment is located in the cloud or at a service provider location (see example of FIG. 2) and is configured to generate the virtual version of the remote control for display in the dashboard UI and/or also receive input from a machine learning engine running on a server machine as part of recommending an action for the agent controller 122 to execute via the virtual version of the remote control for the subscriber 108 location.

Remote control 120 may be provided by the service provider 102 or separately purchased by subscriber 108 for use in controlling the operation of mated equipment located at the at the subscriber 108 location. Remote control 120 may be of the infrared (IR) type, radio frequency (RF) type, voice activated, and/or other type. Light signals emanating from an IR-type remote are typically frequency modulated to reduce interference from other light or heat sources. Remote control 120 may be configured to connect to a personal computer or other device (e.g., via a USB port, Bluetooth, RF) to install programming software such as an input operation collector, an input history store or cache, etc., download command codes, and/or receive personalized graphic icons or overlays for use in reprogramming keys of a remote control. A universal remote control can learn commands from compatible devices, such as STBs, TVs, wirelessly controlled lights, wirelessly controlled cameras, etc. to provide control over a plurality of mated devices using one handheld device. Some automation systems enable use of one programmable universal remote control to manage lighting, security systems, appliances, modems and/or routers, and/or entertainment components using a receiver wired directly into electrical wiring and/or local network 106 for example.

With continued reference to FIG. 1, gateway device 112 is configured to connect the service provider 102 network (i.e., first communications network 104) to local communication network 106 (e.g., a Local Area Network (LAN), a Wireless Local Area Network (WLAN), a Personal Area Network, or other type of network) at subscriber 108 location. The example communication environment 100 may include one or more computing devices such as servers, workstations, set top boxes, desktop computers, laptop computers, tablets, mobile phones, smart devices, gaming devices, IoT devices, cameras, databases, etc. Further details of the computing devices and variations thereof can be found in FIGS. 9 and 10.

Figure 2:
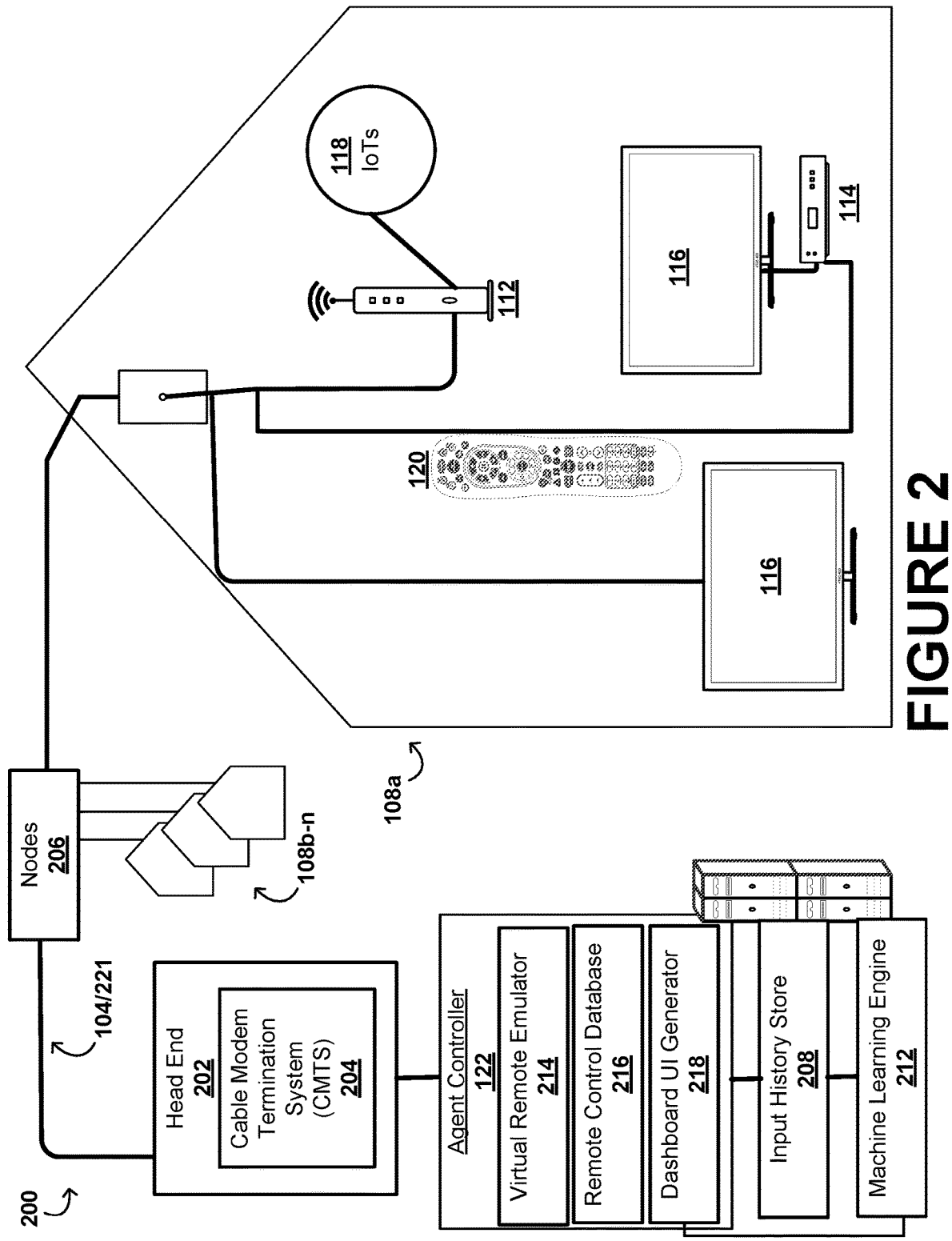
FIG. 2 is a block diagram depicting components of an example system according to an embodiment.

FIG. 2 is a block diagram of a system 200 where the first communications network 104 is embodied as an example HFC or optical network 201 and the local network 106 is embodied as a subscriber network at a first location, of subscriber 108a such as a residential or a business location. Components of the system 200 can be integrated, distributed, and/or provided in any combination of separate systems/components, wherein FIG. 2 provides one implementation example. The HFC network 201 may extend from a head end 202 of the service provider 102 to a plurality of network nodes 206, where each node serves a plurality of subscribers 108a-n using fiber-to-the-home or coaxial for example. For example, each node 206 may serve 50 to 1,000 subscribers within a service area, where the subscribers may subscribe for residential and/or business services.

The service provider 102 may use a cable modem termination system (CMTS) 204 located at the head end 202 to provide high speed data services such as cable, Internet, voice, data, etc. to the various subscribers 108a-n. For example, the CMTS 204 may encode, modulate, and upconvert one or more of the services onto radio frequency (RF) carriers, combine the RF carriers into a single electrical signal, and provide the electrical signal to a broadband optical transmitter. The broadband optical transmitter may convert the electrical signal to a downstream optically modulated signal that is sent to one or more of the network nodes 206 over one or more fiber optic cable lines or other conveying infrastructure.

Each node 206 and/or subscriber 108a location may include a broadband optical receiver to convert the downstream optically modulated signal to an electrical signal (e.g., translate the signal from a light beam to RF). Node 206 may transmit the electrical signal over one or more coaxial cable lines to junction 110 of subscriber 108a serviced by the node 206. Upon receipt of the electrical signal, STB 114, a modem, gateway device 112, and/or other communication component may demodulate the electrical signal in order to deliver data and/or services to one or more devices of the subscriber 108, including STB(s) 114, desktop computers, laptop computers, mobile phones, tablets, gaming devices, television(s) 116, IoT devices 118, cameras, alarms, etc.

The HFC or optical network 201 may operate bi-directionally, whereby signals are transmitted in both downstream and upstream directions. For example, downstream signals may transmit data from the head end 202 to the STB 114 and/or gateway device 112 using a splitter via the respective node 206. The data transmitted in the downstream signals may include content associated with the one or more services being provided, such as video content, voice data, and Internet data, among other examples. The upstream signals may transmit data from the STB 114 and/or gateway device 112 to the head end 202 via the node 206.

With continuing reference to FIG. 2, input history store 208 (e.g., implemented as a database server) of the service provider 102 can store received input operations applied to various remote controls being used by one or more of the subscribers 108a-n, according to the particular remote control types and corresponding input operations applied to each remote control at each subscriber location. The input history store 208 can store all or a defined portion of the input operations applied to a particular remote control for each subscriber. For example, input history store 208 can store input operations applied to an identified subscriber remote control including a type of remote control used, a date/time of each input operation, a type of input operation, etc. for each subscriber remote control. As described below, according to an aspect, agent controller 122 can analyze prior input operations applied to a remote control of one subscriber or a group of subscribers as part of recommended action(s) for remediating an issue reported by a subscriber.

An input history store (not shown) can be included with each subscriber device, such as an input history cache associated or included with one or more of the remote control 120, STB 114, TV 116, IoTs 118, gateway device 112, etc. For example, a portion of memory (e.g., RAM, flash, etc.) of one or more of the devices can be designated and identified as a remote control input history cache that stores input operations received by the remote control 120 for the corresponding target device (e.g., STB 114, TV 116, IoTs 118, gateway device 112). Also, remotes with external connection ports (USB, memory card, etc.) can be coupled with a removable memory device to store physical input operations made to the remote control. Remote control input histories can be pushed from a respective cache to the node 206 and ultimately stored at the input history store 208 of service provider 102, partitioned by subscriber. As described briefly above, input history store 208 can be divided into multiple subscriber databases that list the remote controls used for each subscriber including the particular input operations/codes and/or dates/times of application associated therewith (see example of FIG. 8).

Machine learning engine 212 is configured to use input history information stored in the input history store 208 to train a machine learning algorithm as part of generating an output representative of a recommended action to execute by the agent controller 122 in view of particular input operations received by one or more remote controls of subscriber 108a for example. As an example, a user may press a "power-on" key of remote control 120 in order to power up STB 114. Such an operation may be stored in cache of the remote control 120 and/or STB 114 for example including identifiers for the remote control 120 and STB 114, and/or the command code and/or date/time of the user operation.

Input histories can be pushed from cache to the input history store 208 of the service provider 102 at designated times or intervals. For example, remote control 120 may transmit its remote control input history cache to STB 114 via IR, Bluetooth, or RF signals, for upstream transmission to the service provider 102 for storing in input history store 208. Machine learning engine 212 can use remote control input histories from one subscriber or a plurality of subscribers as part of training the machine learning algorithm (e.g., Logistic Regression (LR), Naive-Bayes, Random Forest (RF), neural networks (NN), matrix factorization, Support Vector Machines (SVM), etc.) and/or providing outputs representative of one or more recommended actions to execute in order to remedy an issue with subscriber equipment or some error by the subscriber that may be affecting use of service provider services. For example, remote control input histories associated with the same type of remote control (e.g., Cox® URC 8820 remote control) used by a plurality of subscribers can be fed into the machine learning algorithm as part of recommending a corrective action for a particular subscriber having issues with using the type of remote control.

The agent controller 122 of an embodiment utilizes a virtual remote emulator 214 to provide a virtual version of a remote control device, such as remote control 120 for example, that enables the agent controller 122 to send identical control signals from the service provider 102 side that the subscriber's remote control would generate upon actuation of a particular key or group of keys of the remote control by the subscriber 108a. Virtual remote emulator 214 of one embodiment includes hardware and software that can be used to capture remote control signals of different formats to determine a width of a pulse, a length of code, number of bits used, lead codes used, system codes used, key codes used, repeat codes used, etc. to populate remote control reference database 216 with the information required to emulate each type or version of remote control (e.g., RC5 code—a single message has a length of fourteen bits that includes: two start bits to control automatic gain control levels in a receiver integrated circuit, a toggle bit to indicate pressing of a new key, five system address bits, and six command bits). Remote control reference database 216 can also store any key or input functions that have been reprogrammed or disabled.

Another example of the virtual remote emulator 214 provides a virtual version of another remote control having 7-bit binary commands:
Where,
Key 1=000 0000
Key 2=000 0001
Key 3=000 0010
Key 4=000 0011
Channel Up=001 0001
Channel Down=001 1001
Power On=001 0101
Power Off=010 1111
Volume Up=001 0010
Volume Down=001 0011

The virtual version of the remote control generated by the virtual remote emulator 214, for this example, also provides additional signaling information to a receiving device including:
a "start" command,
e.g., the command code for "volume up",
a device address, and
a "stop" command (triggered when the "volume up" button is released).

As an example, when an IR receiver on a TV picks up the signal from a mated IR remote control, the IR receiver verifies the address code and decodes the command, it then converts light pulses to an electrical signal that represents "001 0010", passes electrical signal to a remote control microprocessor which operates to increase until the "stop" is reached.

When called, virtual remote emulator 214 can retrieve remote control information from the remote control reference database 216 and/or input history store 208 as part of generating a virtual version of the remote control 120 so that the virtual version can be used remotely to control equipment at the subscriber 108 location. For example, agent controller 122 can use a virtual version of a remote control as part of troubleshooting a modem, STB, TV, or other component (see example of FIG. 6). Once generated by the virtual remote emulator 214, a virtual version of a remote control can be stored in remote control reference database 216 and used in the future without requiring generation by virtual remote emulator 214.

Dashboard UI generator 218 is configured to generate a dashboard UI for the agent controller 122 using user interface tools and graphics processing. Dashboard UI generator 218 of one embodiment is called to generate a dashboard UI that includes a display of the virtual version of the remote control, a remote control input history for a particular subscriber, and/or one or more recommended actions to execute on the virtual version of the remote control in order to control the subscriber equipment remotely by the service provider 102. The virtual remote emulator 214 of one embodiment is also configured to generate the virtual version of the remote control for a display screen of the subscriber that may include highlighting, illustrating, or otherwise identifying any recommended action or actual action(s) taken by the agent controller 122, thereby providing technical knowledge to the subscriber utilizing the virtual version of the remote control. The agent controller 122 of an embodiment can use the virtual version of the remote control to remotely perform one or more operations from a location that is different than a subscriber location including: disabling a remote control being used at a subscriber location, disabling one or more keys of a remote control being used at a subscriber location, and/or changing or resetting one or more functions of a remote control being used at a subscriber location as just a few examples.

As an example of one technical solution provided by system 200, assume that after receiving a service call for a non-responsive cable TV system from a subscriber, a customer care agent launches the agent controller 122 which uses the dashboard UI generator 218 to generate a dashboard UI (see FIG. 6 for example) tailored to the subscriber that displays a virtual version of the subscriber's remote control (e.g., selected from remote control reference database 216). The dashboard UI also provides the subscriber's remote control input history identifying that no remote control input operations have been received for the particular remote control in the input history store 208 for 2 days. The dashboard UI also displays any recommended action or sequence of actions to take according to output by the machine learning engine 212 (e.g., first check if the subscriber is using the correct remote, if true then check the remote control batteries, and the batteries are ok, then restart the STB 114 and/or clean the LED receiver on the STB 114). Any recommend action or sequence of actions along with the virtual version of the remote control can also be conveyed over network 104 to the subscriber for display on a display device or screen or other mechanism used to convey the action(s).

As another example of a technical solution provided by system 200, assume that after receiving a service call from a disabled subscriber (e.g., handicapped in some way), a customer care agent launches the agent controller 122 which uses the dashboard UI generator 218 to generate a dashboard UI tailored for the disabled subscriber that displays a virtual version of the subscriber's remote control (e.g., selected from remote control reference database 216) and that the particular subscriber is blind and has been pressing a non-functional key on his/her remote control according to the input history store 208 for the user's remote control type.

The dashboard UI also displays a recommended action output by the machine learning engine 212 to reconfigure the non-functional key to a functional key with the intended function sought by the disabled user. The virtual remote emulator 214 can be configured to generate a virtual version of the remote control for interacting with the disabled user to accommodate the user handicap. For example, a virtual version of a remote control for a blind user may include auditory assistance regarding the location of a remote control feature, use of the non-functional key is now functional, etc. Accordingly, any recommended action or sequence of actions along with the virtual version of the remote control can be provided (e.g., visually, audibly, and/or tactile) over network 104 to a subscriber for display or other interactivity.

As another example, assume that after receiving a service call from another subscriber, the customer care agent uses the agent controller 122 to refresh the dashboard UI tailored for the current subscriber that displays a virtual version of the subscriber's remote control and any recommended action or sequence of actions to take output by the machine learning engine 212. The recommended action output by the machine learning engine 212 recommends using the virtual version of the subscriber's remote control to remotely disable one or more functions of the remote control being used by the subscriber. For example, the agent controller 122 can use the virtual version of the subscriber's remote control to send a control signal to the mated equipment to disable a particular function or feature normally activated by pressing a key on the subscriber's remote control by mapping a null functionality to the corresponding key.

As further example, assume that after receiving another service call from another subscriber, the customer care agent uses the agent controller 122 to refresh the dashboard UI tailored for the current subscriber that displays a virtual version of the subscriber's remote control and any recommended action or sequence of actions to take output by the machine learning engine 212 that include using the virtual version of the subscriber's remote control to remotely change or reset one or more functions of the remote control being used by the subscriber. The agent controller 122 can use the virtual version of the subscriber's remote control to send a control signal to the mated equipment to map a new function to, or reset a function of, an existing key of the remote control being used at the subscriber location. For example, agent controller 122 can use the virtual version of the subscriber's remote control to send a control signal to a mated STB so that HDMI Input 1 is the first toggled command when the subscriber presses the INPUT key. It will be appreciated that additional functional and/or programmable control logic (e.g., for identifying memory locations for an input history cache, disabling keys or other features, etc.) may need to be added to the user's equipment in order to provide the various features described herein including the ability to disable or map new functions to exiting keys of the subscriber remote.

Figure 3:
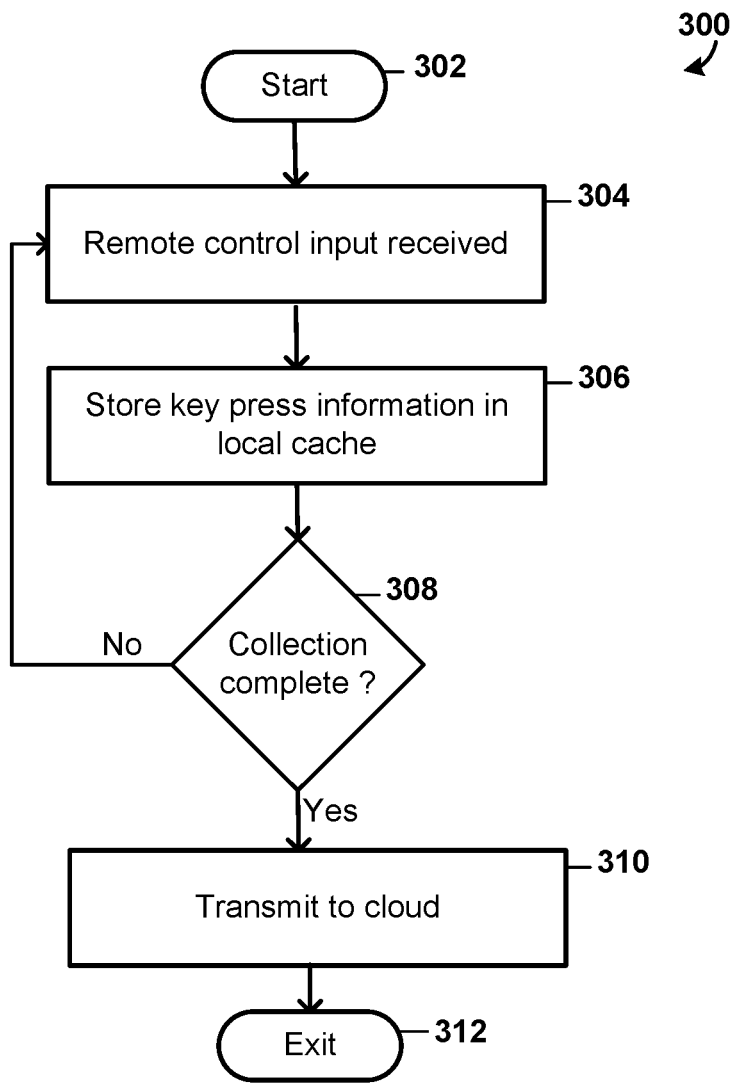
FIG. 3 depicts a process of collecting input operations associated with physical inputs made to a remote control of a subscriber according to an embodiment.

FIG. 3 depicts a process 300 of collecting input operations associated with physical inputs made to a remote control by a subscriber. Process 300 starts at 302 and proceeds to 304 when a key of the remote control is pressed or otherwise actuated by the subscriber. For example, a user may use a remote control to change a cable TV channel by pointing the remote control at the STB and pressing the "up channel" button. At 306, process 300 stores information associated with the key press in a local cache of the STB, remote control, or other device that identifies the remote control as the device used during the keypress along with control information associated with the key press. For example, the process 300 at 306 can store a remote control identifier, a receiving device identifier, a code used to effectuate the channel operation, and/or a time and/or date stamp that the input was executed.

If the input operations are complete at 308, process 300 proceeds to 310 and transmits the input history for the remote control of the subscriber from the local cache to the service provider and exits at 312. For example, the process 300 at 310 can use a STB or gateway device to transmit the input history from the local cache for storage in the input history store 208 of the service provider after a certain period of time such as at the start/end/other time of each day, or after a certain period of non use or idle time of the remote control. Depending on the size of the local cache, after transmitting the input history for the remote control to the service provider, the local cache maybe deleted or overwritten using local programmable logic.

If the input operations are not complete at 308, process 300 returns to 304 and waits for a next key press. For example, process 300 can be configured to wait for a next input operation if a remote control idle time threshold has not been reached or a time to upload input history threshold has not been reached. It will be appreciated that remote control input histories for a plurality of remote controls and subscribers can be sent to the service provider at various times or in batches for use in generating the dashboard UI for one or more subscribers and training the machine learning engine 212 with new remote control usage data.

Figure 4:
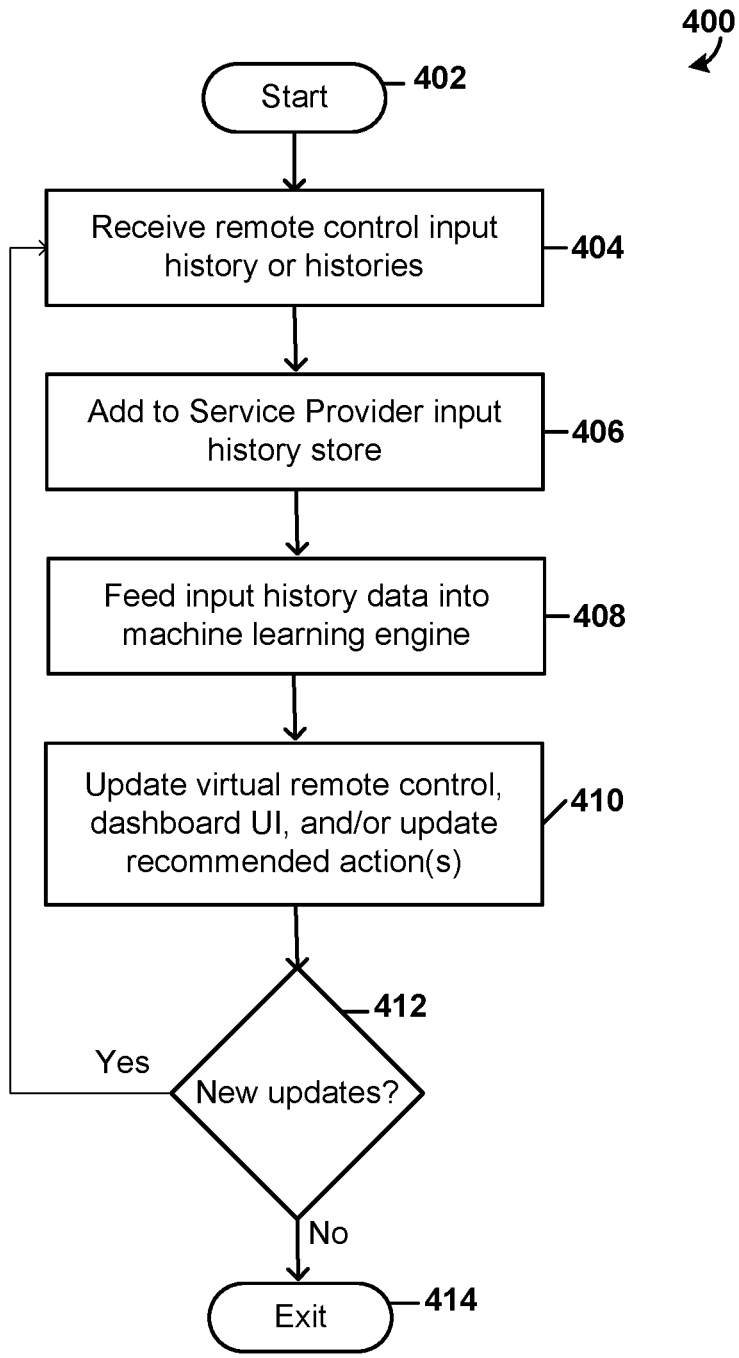
FIG. 4 depicts a process of using collected remote control input histories as part of executing a machine learning engine to provide one or more recommended actions according to an embodiment.

FIG. 4 depicts a process 400 of using collected remote control input histories as part of executing the machine learning engine 212 to provide one or more recommended actions according to a machine learning algorithm and/or remote control input histories from one subscriber or a plurality of subscribers. Machine learning algorithms can be tailored for a particular subscriber and/or group of subscribers (e.g., Logistic Regression (LR), Naive-Bayes, Random Forest (RF), neural networks (NN), matrix factorization, Support Vector Machines (SVM), etc.). Process 400 start at 402 and proceeds to 404 where process 400 receives remote control input histories associated with inputs made to one or more remote controls being used by a subscriber or a group of subscribers. For example, a data center housing a service provider input history store server can receive remote control input histories being pushed directly from each subscriber or in batches from a plurality of subscribers or nodes. At 406, process 400 stores the remote control input histories at the server provider location, such as a data center or cloud location for example. At 408, process 400 feeds input history data into the machine learning engine 212 as part of further training of the machine learning algorithm and/or for determining one or more recommended actions for a subscriber or a group of subscribers taking into account the distinct input histories associated with each remote control that is deployed across the subscriber locations. At 410, process 400 operates to update aspects of a virtual version of a subscriber remote control if warranted, update dashboard UI and/or controls, and/or update recommended action(s) for a particular subscriber or group of subscribers according to type of remote control(s) used (e.g., make/model/version, etc.). If no new updates are received at 412, process 400 exits at 414. If there are new updates at 412, process 400 returns to 404.

Figure 5:
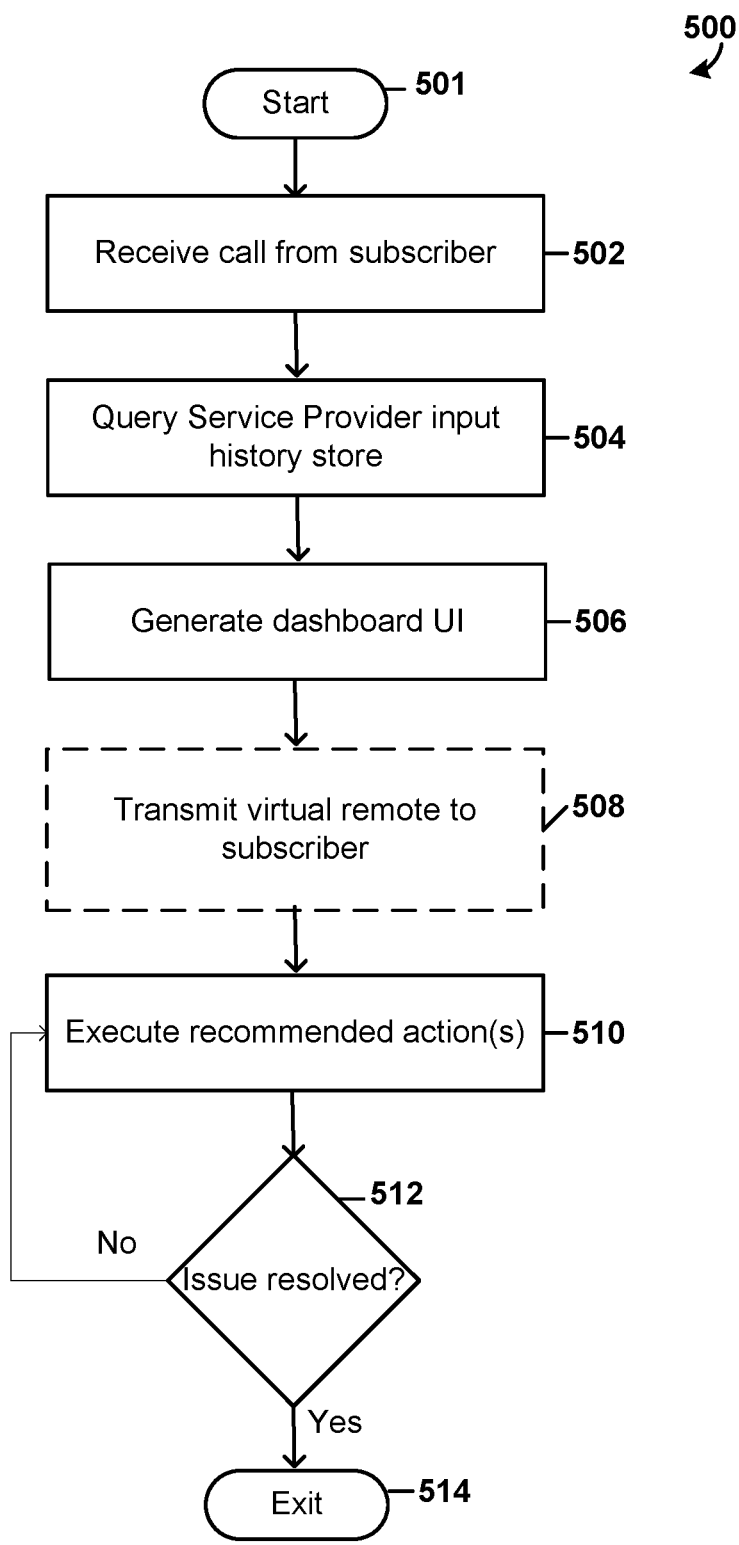
FIG. 5 depicts a process of generating a dashboard UI and/or a virtual version of a subscriber remote control according to an embodiment.

FIG. 5 depicts a process 500 of generating a dashboard UI and/or a virtual version of a subscriber remote control. While process 500 is illustrated in the context of a subscriber service call, it will be appreciated that disclosure it not so limited. Process 500 begins at 501 and proceeds to 502 when a call or other communication is received by a customer care agent from a subscriber of service provider 102 who is having technical issues when trying to access services, such as cable TV for example available via the service provider 102. For example, a subscriber might initiate a service call by pressing a designated remote control key or using a voice command to activate or initiate use of a virtual version of a remote control including when multiple remote controls are with the subscriber. At 504, the care agent uses the agent controller 122 to query the service providers input history store 208 for one or more remote control input histories for the subscriber and/or remote control reference database 216 for virtual versions of any remote controls. For example, the subscriber's location might utilize multiple remote controls each of which can have a corresponding input history and virtual versions of the remote controls may have already been generated and stored in remote control reference database 216 for display in the dashboard UI.

At 506, process 500 generates a dashboard UI that is tailored for the particular subscriber including provision of one or more virtual versions of the remote controls that are deployed and being used by the subscriber, remote control input histories for each remote, and/or recommended action (s). The virtual remote emulator 214 may generate a virtual version of a remote control initially configured with the identical functionality of the user's remote control or can be provided with any changed or updated features already implemented with the user remote such as disabling or changing the function of a key or button. A mapping database can be used to track reconfigured keys for each remote (e.g., disabled or reconfigured keys).

At 508, the process 500 can optionally transmit the subscriber's remote control input history and/or the virtual version of the remote control for display on a subscriber device, such as on a smart phone tablet TV or other display for example, along with highlighting or otherwise directing the subscriber to a particular corrective action or actions, such as using a different remote control key or a different sequence of remote control keys. At 510, process 500 can execute any recommended action or actions output by the machine learning engine 212 via the virtual version of the remote control.

In one embodiment, process 500 uses the virtual version of the remote control to send a control signal to user equipment that blocks the reception of signals conveyed by the subscriber's remote control before executing any action or recommended action. For example, a control signal can be sent from the virtual version of the remote control over the service provider network 104 to a STB or TV instructing the local processor to disable any remote control receiver until instructed to re-enable the remote control receiver. Various user equipment may be updated with programmable code or logic that enables the agent controller 122 to control subscriber equipment from a location that is different from the subscriber's location. If the recommended action remedies the issue at 512, process 500 exits at 514. If the issue remains unresolved at 512, process 500 returns to 510 to execute the next recommended action or actions, or if no recommended actions remain, attempts to schedule a service call for the subscriber location before exiting at 514.

Figure 6:
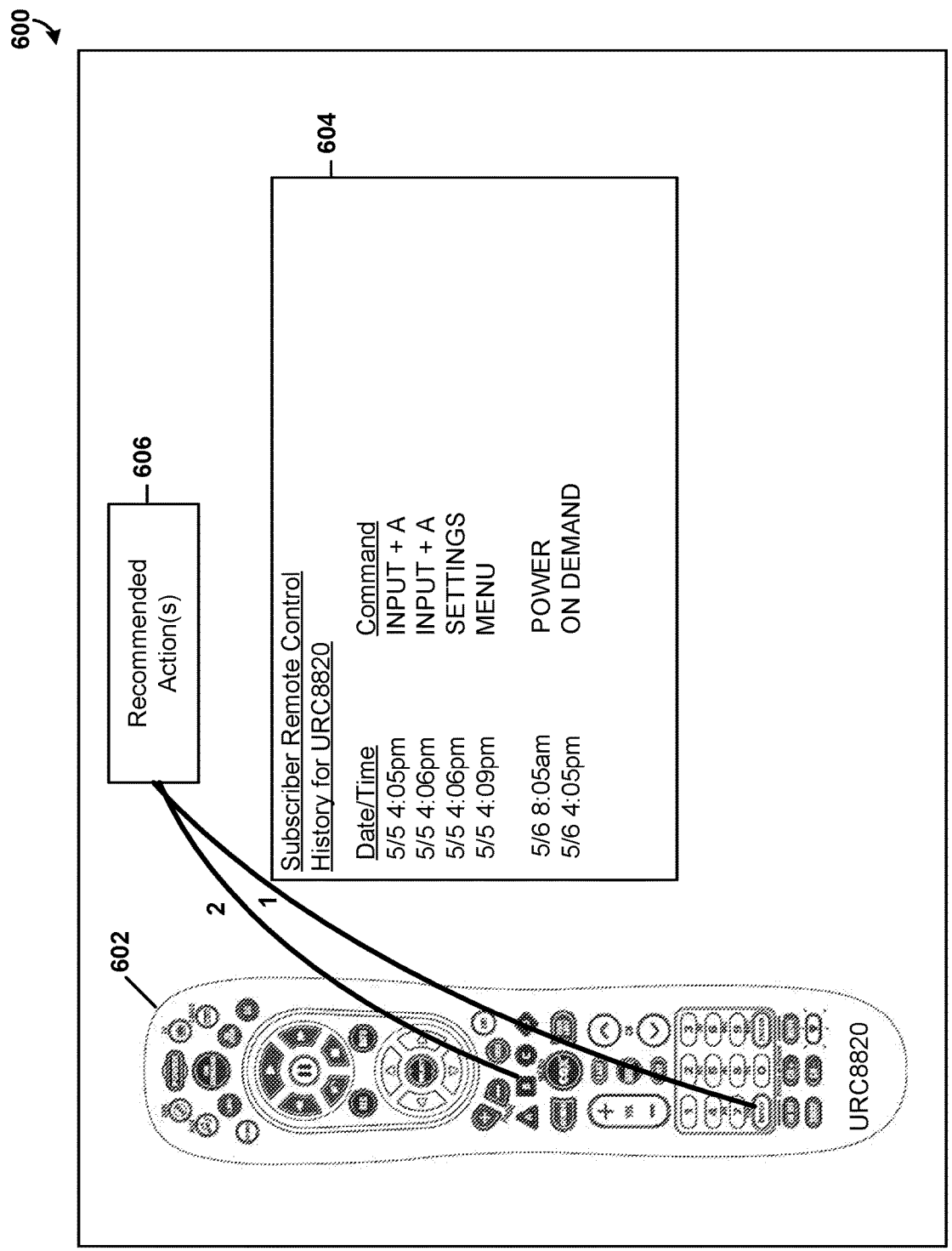
FIG. 6 depicts an example dashboard UI.

FIG. 6 depicts an example dashboard UI 600 that is displayed on a computer screen or other display of a care agent after launching the agent controller 122. As shown in FIG. 6, the exemplary layout of dashboard UI 600 includes a virtual version of a subscriber's remote control 602, a table 604 that includes the remote control input history, pulled from the input history store 208 of the service provider 102, for the remote control being used at the subscriber location. For example, the dashboard UI 600 can be displayed on a touch screen where a care agent is able to touch virtual keys of the virtual remote control as part of issue troubleshooting, remotely programming a subscriber remote control, remotely disabling a subscriber remote control, etc. In some instances, multiple virtual remote control versions can be displayed in the dashboard UI 600 depending on the types and quantity of equipment being used at a subscriber location. In some cases, the agent controller 122 can request an update of any remote control operations performed at the subscriber location in order to populate dashboard UI 600 with the most recent remote control usage data. For this example, dashboard UI 600 also displays a recommended action(s) 606 in textual form along with highlighting of the key(s) on the virtual version of a subscriber's remote control 602 that shows a care agent which key(s) to use and the order to effectuate the recommended action(s) provided by the machine learning engine 212.

Figure 7:
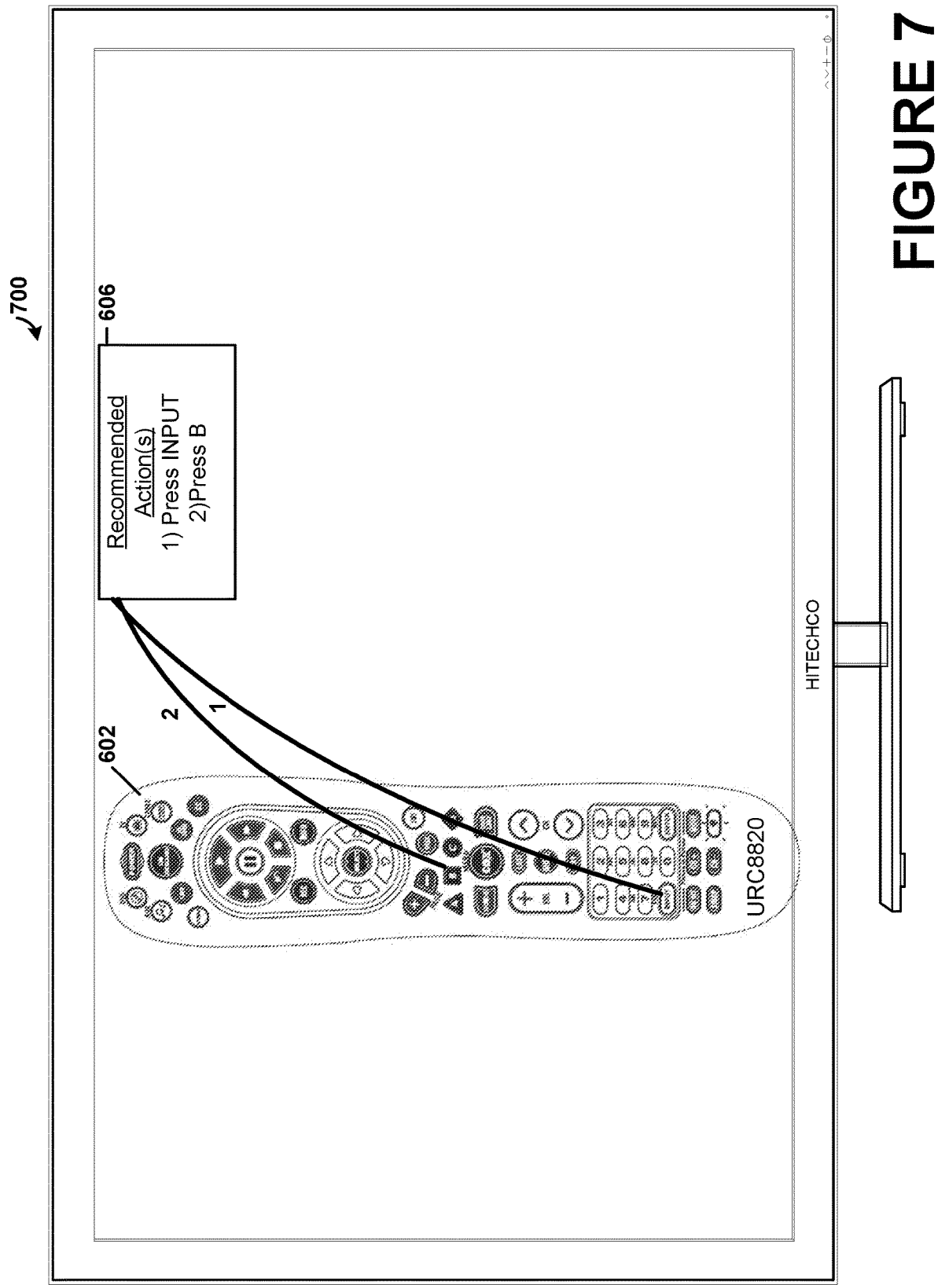
FIG. 7 depicts an exemplary TV screen located at a subscriber residence displaying a virtual version of the subscriber's remote control.

FIG. 7 depicts a TV screen 700 located at the subscriber residence displaying a virtual version of the subscriber's remote control 602 as part of a service call where the subscriber has called the service provider with the issue and after the care agent has initiated the agent controller 122. For example, during a service call, the care agent can ask the subscriber to turn on the TV and tune to a particular channel that allows the agent controller 122 to transmit all or a portion of the care agent's dashboard UI 600 for display on the TV screen 700. The virtual version of the subscriber's remote control 602 can be communicated to the TV screen 700 via one or more of the service provider network 104 and/or the local network 106. As shown in FIG. 7, the TV screen 700 also displays the recommended action(s) in textual form along with highlighting of the key(s) on the virtual version of the subscriber's remote control 602 that guides the subscriber on how to take the corrective action(s) if the situation or issue reoccurs.

Figure 8:
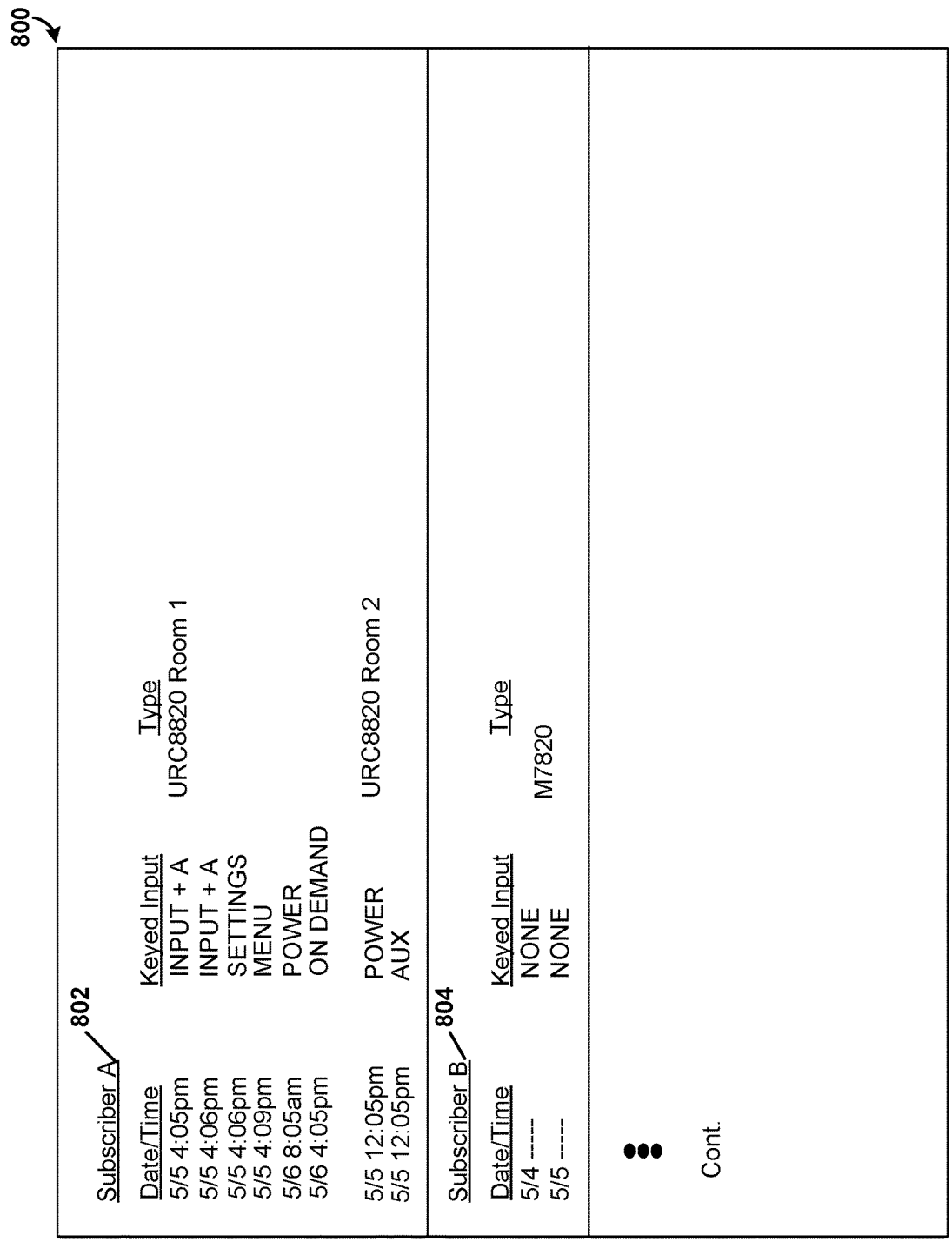
FIG. 8 depicts an example table of an input history store maintained by a service provider.

FIG. 8 depicts a table 800 of the input history store 208 of the service provider 102 that stores remote control input operations associated with a plurality of subscribers of the service provider 102. As shown for this example, table 800 includes remote control input histories associated with two subscribers 802 and 804. As described above, the remote control input histories can be stored locally on subscriber equipment and sent to the input history store 208 of the service provider 102 at select times. For this example, local cache of subscriber 802 included a remote control input history 806 encompassing 2 days, whereas local cache of subscriber 804 included a remote control input history 806 encompassing less than a day.

Figure 9:
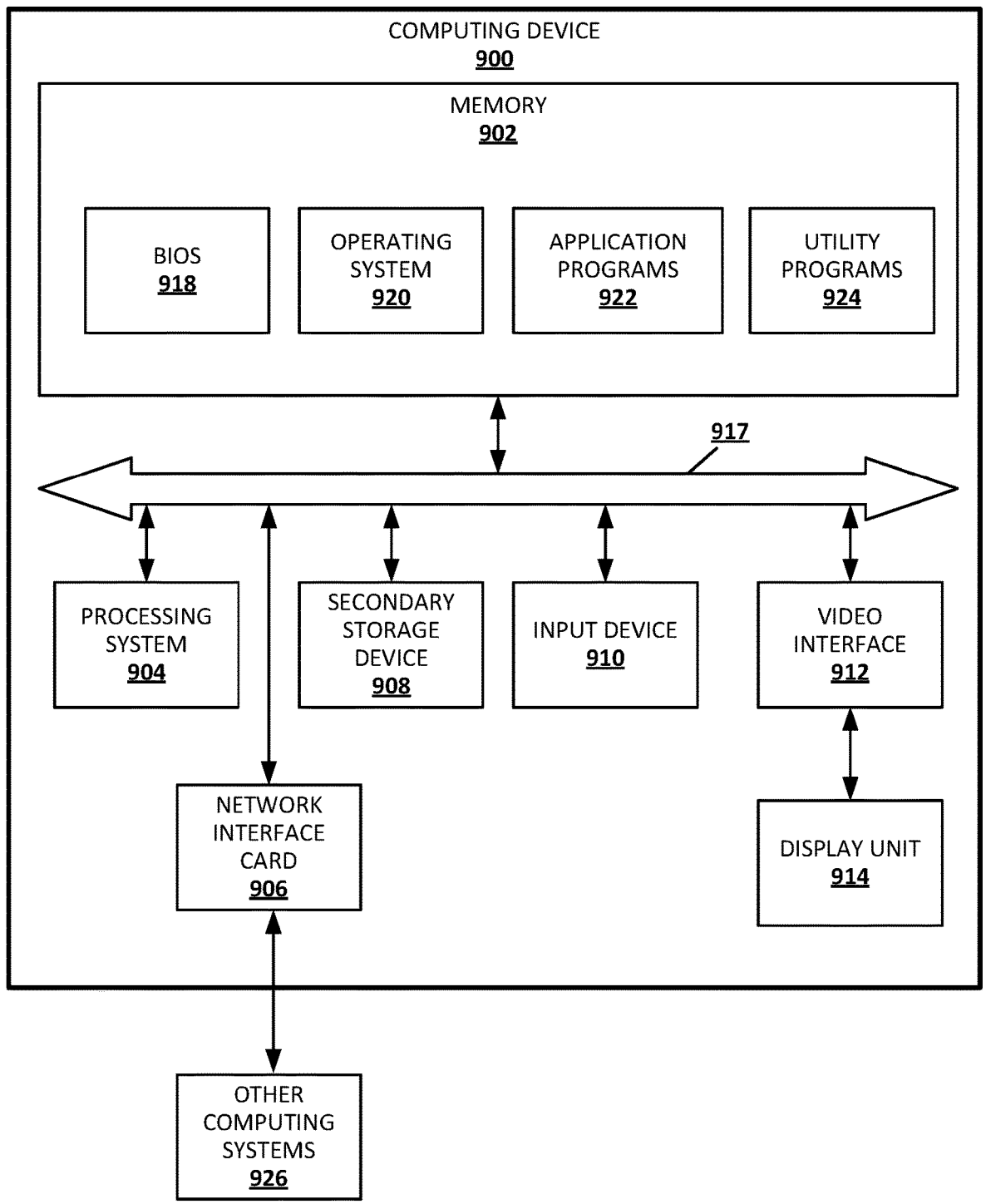
FIG. 9 is a block diagram illustrating example physical components of a computing device or system with which embodiments may be practiced.

FIG. 9 is a block diagram illustrating example physical components of a computing device 900 or system with which embodiments may be practiced. It should be appreciated that in other embodiments, different hardware components other than those illustrated in the example of FIG. 9 may be used. Computing devices may be implemented in different ways in different embodiments. For instance, in the example of FIG. 9, the computing device 900 includes a processing system 904, memory 902, a network interface card 906 (wired and/or wireless), a secondary storage device 908, an input device 910, a video interface 912, a display unit 914, and a communication medium 917. In other embodiments, the computing device 900 may be implemented using more or fewer hardware components (e.g., a video interface, a display unit, or an input device) or in combination with other types of computer systems 926 and program modules.

The memory 902 includes one or more computer-readable storage media capable of storing data and/or computer-executable instructions. Memory 902 may store the computer-executable instructions that, when executed by a processor or processing unit of the processing system 904, cause operations, such as the operations described above with respect to FIGS. 3-5). In various embodiments, the memory 902 is implemented in various ways. For example, the memory 902 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 904 includes one or more processing units (e.g., one or more processors), which may include tangible integrated circuits that selectively execute computer-executable instructions. In various embodiments, the processing units in the processing system 904 are implemented in various ways. For example, the processing units in the processing system 904 can be implemented as one or more processing cores. In this example, the processing system 904 can comprise one or more microprocessors. In another example, the processing system 904 can comprise one or more separate microprocessors. In yet another example embodiment, the processing system 904 can comprise Application-Specific Integrated Circuits (ASICs) that provide specific functionality. In yet another example, the processing system 904 provides specific functionality by using an ASIC and by executing computer-executable instructions.

The computing device 900 may be enabled to send data to and receive data from a communication network via a network interface card 906. In different embodiments, the network interface card 906 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 908 includes one or more computer-readable storage media, and may store data and computer-executable instructions not directly accessible by the processing system 904. That is, the processing system 904 performs an I/O operation to retrieve data and/or computer-executable instructions from the secondary storage device 908. In various embodiments, the secondary storage device 908 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 910 enables the computing device 900 to receive input from a user. Example types of input devices include, but are not limited to, keyboards, mice, trackballs, stylus input devices, key pads, microphones, joysticks, touch-sensitive display screens, and other types of devices that provide user input to the computing device 900.

The video interface 912 outputs video information to the display unit 914. In different embodiments, the video interface 912 is implemented in different ways. For example, the video interface 912 is a video expansion card. In another example, the video interface 912 is integrated into a motherboard of the computing device 900. In various embodiments, the display unit 914 can be an LCD display panel, a touch-sensitive display panel, an LED screen, a projector, a cathode-ray tube display, or another type of display unit. In various embodiments, the video interface 912 communicates with the display unit 914 in various ways. For example, the video interface 912 can communicate with the display unit 914 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 917 facilitates communication among the hardware components of the computing device 900. In different embodiments, the communications medium 917 facilitates communication among different components of the computing device 900. For instance, in the example of FIG. 9, the communications medium 917 facilitates communication among the memory 902, the processing system 904, the network interface card 906, the secondary storage device 908, the input device 910, and the video interface 912. In different embodiments, the communications medium 917 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 902 stores various types of data and/or software instructions. For instance, in the example of FIG. 9, the memory 902 stores a Basic Input/Output System (BIOS) 918, and an operating system 920. The BIOS 918 includes a set of software instructions that, when executed by the processing system 904, cause the computing device 900 to boot up. The operating system 920 includes a set of software instructions that, when executed by the processing system 904, cause the computing device 900 to provide an operating system that coordinates the activities and sharing of resources of the computing device 900. The memory 902 also stores one or more application programs or program code 922 that, when executed by the processing system 904, cause the computing device 900 to provide applications to users. The memory 902 also stores one or more utility programs 924 that, when executed by the processing system 904, cause the computing device 900 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

Figure 10:
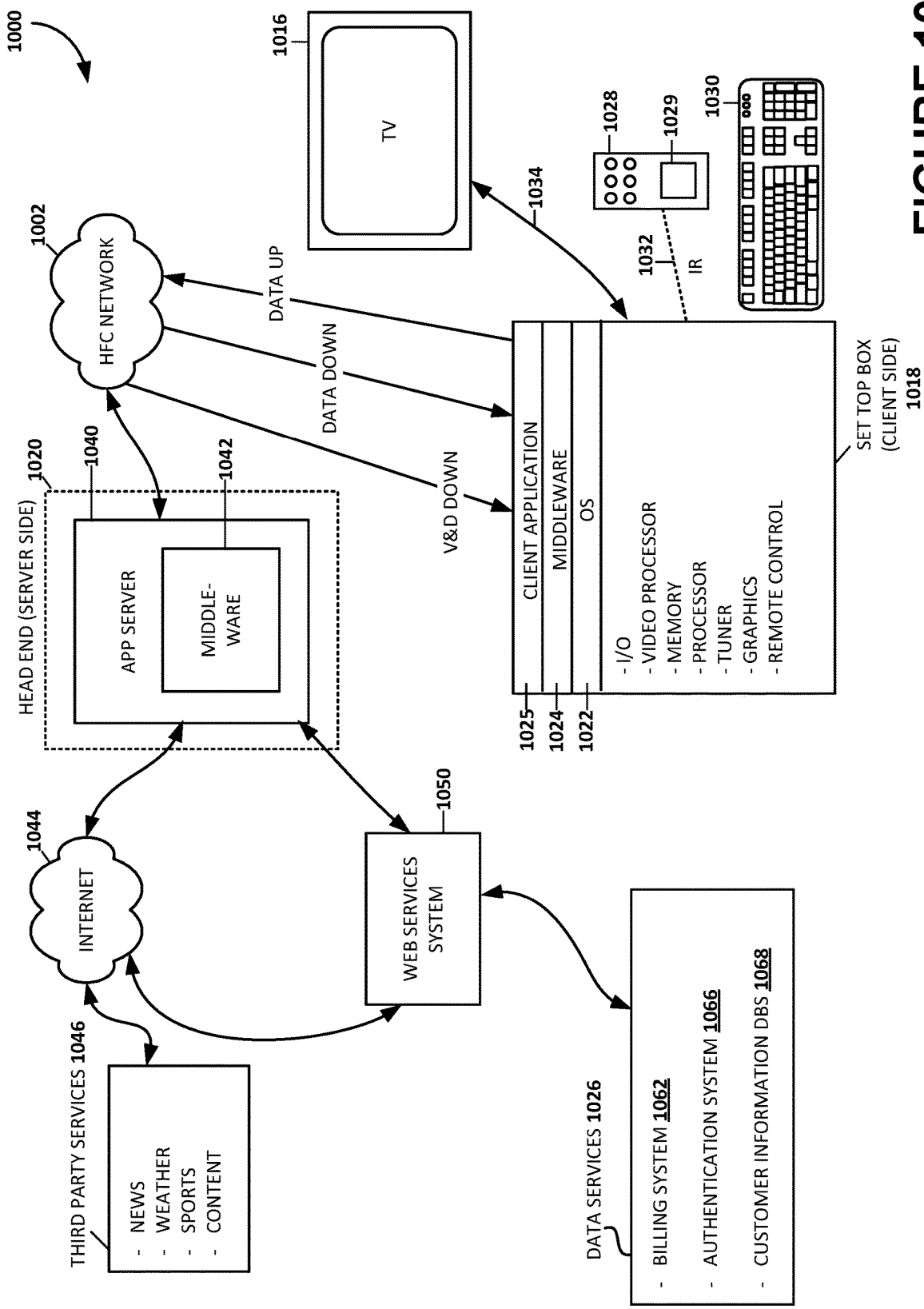
FIG. 10 is a block diagram illustrating components of a cable services system architecture providing an example operating environment according to aspects of the present disclosure.

FIG. 10 is a block diagram illustrating a cable television services system 1000 (hereafter referred to as "CATV") architecture providing an operating environment according to an aspect. According to aspects, the service provider 102 may operate in the form of a CATV 1000 as illustrated and described in FIG. 10. As should be appreciated, a CATV services system 1000 is but one of various types of systems that can be utilized for providing an operating environment described herein. Referring now to FIG. 10, digital and analog video programming, information content and interactive television services are provided via a HFC network 1002 to a television set 1016 for consumption by a cable television/services system customer. As is known to those skilled in the art, HFC networks 1002 combine both fiber optic cable lines and coaxial cable lines. Typically, fiber optic cable lines run from the cable head end 1020 to neighborhoods of subscribers. Coaxial cable lines run from the optical fiber feeders to each customer or subscriber.

The CATV system 1000 is in the form of a distributed client-server computing system for providing video and data flow across the HFC network 1002 between server-side services providers (e.g., cable television/services providers), such as video content feed provider 102*a*, via a server-side head end 1020 and a client-side customer via a STB 114/1018 functionally connected to a customer receiving device, such as the television set 1016. The functionality of the HFC network 1002 allows for efficient bidirectional data flow between the set-top box 1018 and an application server 1040 of the server-side head end 1020. As is understood by those skilled in the art, modern CATV systems 1000 can provide a variety of services across the HFC network 1002 including traditional digital and analog video programming, telephone services, high speed Internet access, video-on-demand, and services.

On the client side of the CATV system 1000, digital and analog video programming and digital and analog data are provided to the customer television set 1016 via the STB 1018. Interactive television services that allow a customer to input data to the CATV system 1000 likewise are provided by the STB 1018. As illustrated in FIG. 10, the STB 1018 is a multipurpose computing device having a computer processor, memory, and an input/output mechanism. The input/output mechanism receives input from server-side processes via the HFC network 1002 and from customers via input devices such as a remote control device 1028, keyboard 1030, or other computing device, such as a tablet/slate computer, smart phone, etc. The remote control device 1028 and the keyboard 1030 can communicate with the STB 1018 via a suitable communication transport such as the infrared connection 1032. The remote control device 1028 can include a biometric input module 1029. The STB 1018 also includes a video processor for processing and providing digital and analog video signaling to the television set 1016 via a cable communication transport 1034. A multi-channel tuner is provided for processing video and data to and from the STB 1018 and the server-side head end 1020, described below.

The STB 1018 also includes an operating system 1022 for directing the functions of the STB 1018 in conjunction with a variety of client applications 1025. For example, if a client application 1025 requires a news flash from a third-party news source to be displayed on the television 1016, the operating system 1022 can cause the graphics functionality and video processor of the STB 1018, for example, to output the news flash to the television 1016 at the direction of the client application 1025 responsible for displaying news items.

Because a variety of different operating systems 1022 can be utilized by a variety of different brands and types of set-top boxes 1018, a middleware layer 1024 can be provided to allow a given software application to be executed by a variety of different operating systems. According to an embodiment, the middleware layer 1024 can include a set of application programming interfaces (APIs) that are exposed to client applications and operating systems 1022 that allow client applications 1025 to communicate with the operating systems 1022 through common data calls understood via the API set. As described below, a corresponding middleware layer 1042 is included on the server side of the CATV system 1000 for facilitating communication between the server-side application server and the client-side STB 1018. The middleware layer 1042 of the server-side application server and the middleware layer 1024 of the client-side STB 1018 can format data passed between the client side and server side according to the Extensible Markup Language (XML).

According to one aspect, the STB 1018 passes digital and analog video and data signaling to the television 1016 via a one-way communication transport 1034. According to other aspects, two-way communication transports can be utilized, for example, via high definition multimedia (HDMI) ports. The STB 1018 can receive video and data from the server side of the CATV system 1000 via the HFC network 1002 through a video/data downlink and data via a data downlink. The STB 1018 can transmit data from the client side of the CATV system 1000 to the server side of the CATV system 1000 via the HFC network 1002 via one data uplink. The video/data downlink is an "in band" downlink that allows for digital and analog video and data signaling from the server side of the CATV system 1000 through the HFC network 1002 to the STB 1018 for use by the STB 1018 and for distribution to the television set 1016. As is understood by those skilled in the art, the "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 10, between the HFC network 1002 and the STB 1018 comprise "out of band" data links. As is understand by those skilled in the art, the "out of band" frequency range is generally at a lower frequency than "in band" signaling. For example, the "out of band" frequency range can be between zero and 54 megahertz. Data flow between the STB 1018 and the server-side application server 1040 is typically passed through the "out of band" data links. Alternatively, an "in band" data carousel can be positioned in an "in band" channel into which a data feed can be processed from the application server 1040 through the HFC network 1002 to the STB 1018. Operation of data transport between components of the CATV system 1000, described with reference to FIG. 10, is well known to those skilled in the art.

Referring still to FIG. 10, the head end 1020 of the CATV system 1000 is positioned on the server side of the CATV system and includes hardware and software systems responsible for originating and managing content for distributing through the HFC network 1002 to client-side STBs 1018 for presentation to customers. As described above, a number of services can be provided by the CATV system 1000, including digital and analog video programming, interactive television services, telephone services, video-on-demand services, targeted advertising, and/or provision of supplemental content.

The application server 1040 can be configured as a computing system operative to assemble and manage data sent to and received from the STB 1018 via the HFC network 1002. As described above, the application server 1040 includes a middleware layer 1042 for processing and preparing data from the head end 1020 of the CATV system 1000 for receipt and use by the client-side STB 1018. For example, the application server 1040 via the middleware layer 1042 can obtain supplemental content from third-party services 1046 via the Internet 1044 for transmitting to a customer through the HFC network 1002, the STB 1018, and recording by a local or remote DVR. For example, content metadata from a third-party content provider service can be downloaded by the application server 1040 via the Internet 1044. When the application server 1040 receives the downloaded content metadata, the middleware layer 1042 can be utilized to format the content metadata for receipt and use by the STB 1018. Therefore, content metadata can be sent and categorized based on the availability to the customer's program guide data.

According to one embodiment, data obtained and managed by the middleware layer 1042 of the application server 1040 is formatted according to the Extensible Markup Language and is passed to the STB 1018 through the HFC network 1002 where the XML-formatted data can be utilized by a client application 1025 in concert with the middleware layer 1024, as described above. As should be appreciated by those skilled in the art, a variety of third-party services data 1046, including news data, weather data, sports data and other information content can be obtained by the application server 1040 via distributed computing environments such as the Internet 1044 for provision to customers via the HFC network 1002 and the STB 1018. Additionally, the application server 1040 may receive data via the Internet 1044.

According to aspects, the application server 1040 obtains customer support services data, including billing data, information on customer work order status, answers to frequently asked questions, services provider contact information, and the like from data services 1026 for provision to the customer via an interactive television session. The data services 1026 include a number of services operated by the services provider of the CATV system 1000 which can include profile and other data associated with a given customer.

A billing system 1062 can include information such as a customer's name, street address, business identification number, Social Security number, credit history, and information regarding services and products subscribed to by the customer. According to embodiments, the billing system 1062 can also include billing data for services and products subscribed to by the customer for bill processing, billing presentment and payment receipt. An authentication system 1066 can include information such as secure user names, subscriber profiles, subscriber IDs, and passwords utilized by customers for access to network services. A customer information database 1068 can include general information about customers such as place of employment, business address, business telephone number, and demographic information such as age, gender, educational level, and the like. The customer information database 1068 can also include information on pending work orders for services or products ordered by the customer. The customer information database 1068 can also include general customer information such as answers to frequently asked customer questions and contact information for various service provider offices/departments. As should be understood, this information can be stored in a variety of disparate databases operated by the cable services provider.

Referring still to FIG. 10, web services system 1050 is illustrated between the application server 1040 and the data services 1026. According to aspects, web services system 1050 serves as a collection point for data requested from each of the disparate data services systems comprising the data services 1026. According to aspects, when the application server 1040 requires customer services data from one or more of the data services 1026, the application server 1040 passes a data query to the web services system 1050. The web services system 1050 formulates a data query to each of the available data services systems for obtaining any required data for a requesting customer as identified by a set-top box identification associated with the customer. The web services system 1050 serves as an abstraction layer between the various data services systems and the application server 1040. That is, the application server 1040 is not required to communicate with the disparate data services systems, nor is the application server 1040 required to understand the data structures or data types utilized by the disparate data services systems. The web services system 1050 is operative to communicate with each of the disparate data services systems for obtaining necessary customer data. The customer data obtained by the web services system is assembled and is returned to the application server 1040 for ultimate processing via the middleware layer 1042, as described above. As should be understood by those skilled in the art, the disparate systems 1050, 1062, 1066, 1068 can be integrated or provided in any combination of separate systems, wherein FIG. 10 shows only one example.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

What is claimed is:

1. A system comprising:
   an input history store to store one or more input operations corresponding to received user inputs to a remote control that controls a network device at a subscriber location, wherein the remote control and the network device are physically located at the subscriber location and the network device is in communication with a hybrid fiber coaxial (HFC) or fiber-to-the-home network; and
   an agent controller associated with a service provider that generates a dashboard user interface (UI) at a remote location relative to the subscriber location and is in communication with the HFC or the fiber-to-the-home network to remotely interact with different subscriber locations, wherein the dashboard UI operates to display at the remote location:
      a virtual version of the remote control;
      one or more of the input operations corresponding to the received user inputs to the remote control at the subscriber location; and/or
      a recommended action to execute on the virtual version of the remote control from the remote location to assist a user with troubleshooting equipment at the subscriber location.

2. The system of claim 1, wherein the input history store is included as part of one or more of the remote control, the network device, or a cloud-based device.

3. The system of claim 1, wherein the input history store stores the user input operations comprising key or button actuations over a defined period and uses a date and/or time stamp to identify a time of reception of each user input operation.

4. The system of claim 3, wherein the agent controller accesses the input history store to display the user input operations with the remote control over a defined period in the dashboard UI.

5. The system of claim 1, wherein the agent controller uses a virtual version of the remote control to send control signals to the network device from the agent controller.

6. The system of claim 5, wherein the remote control or the network device includes a remote power control operable to receive a control signal from the agent controller to disable operation of the remote control at the subscriber location.

7. The system of claim 6, wherein the agent controller sends the control signal to the remote power control to disable the remote control before using the virtual version of the remote control to send one or more control signals to the network device.

8. The system of claim 1, further comprising a machine learning engine to receive the user input operations from the input history store to determine the recommended action to execute on the virtual version of the remote control by the agent controller.

9. The system of claim 8, wherein the recommended action in conjunction with the virtual version of the remote control are provided to the subscriber location to enable a subscriber to understand a corrective action employed by the agent controller with respect to appropriate use of the remote control.

10. The system of claim 1, wherein the network device includes a set-top box (STB), modem/router, television, or other networked device in communication with the HFC or the fiber-to-the-home network.

11. A method comprising:
   storing user input operations associated with actuation of keys of a remote control being used at a subscriber location;
   generating, at a remote location relative to the subscriber location, a virtual version of the remote control as part of a dashboard UI that displays a layout of the remote control being used at the subscriber location;
   outputting, via a machine learning engine, a recommended action to execute on the virtual version of the remote control according to the user input operations associated with actuation of keys of the remote control being used at the subscriber location; and displaying, via the dashboard UI at the remote location, the virtual version of the remote control, one or more of the user input operations associated with actuation of keys of the remote control being used at the subscriber location, and the recommended action to execute on the virtual version of the remote control from the remote location to assist a user with troubleshooting equipment at the subscriber location.

12. The method of claim 11, further comprising applying a date and/or time stamp to identify when each user input operation occurred.

13. The method of claim 11, further comprising displaying the user input operations with the remote control over a defined period in the dashboard UI.

14. The method of claim 11, further comprising sending a control signal to disable the operation of the remote control before using the virtual version of the remote control to send one or more control signals to a network device at the subscriber location to execute the recommended action.

15. The method of claim 11, further comprising providing, for display at the subscriber location, the recommended action in conjunction with the virtual version of the remote control to enable a subscriber to understand a corrective action employed with respect to appropriate use of the remote control.

16. The method of claim 11, further comprising remotely disabling one or more functions of the remote control being used at the subscriber location.

17. The method of claim 16, further comprising remotely changing or resetting one or more functions of the remote control being used at the subscriber location.

18. A non-transitory computer readable media that includes instructions which, when executed, operate to:

store user input operations associated with actuation of keys of a remote control being used at a subscriber location;

generate, at a remote location relative to the subscriber location, a virtual version of the remote control as part of a dashboard UI that displays a layout of the remote control being used at the subscriber location;

output, via a machine learning engine, a recommended action to execute on the virtual version of the remote control according to the user input operations associated with actuation of keys of the remote control being used at the subscriber location; and display, via the dashboard UI at the remote location, the user input operations associated with actuation of keys of the remote control being used at the subscriber location and the recommended action to execute on the virtual version of the remote control from the remote location to assist a user with troubleshooting equipment at the subscriber location.

19. The non-transitory computer readable media of claim 18, further to remotely perform one or more operations from the remote location that is different than the subscriber location including: disabling the remote control being used at the subscriber location, disabling one or more keys of the remote control being used at the subscriber location, and/or changing or resetting one or more functions of the remote control being used at the subscriber location.

20. The non-transitory computer readable media of claim 18, further to provide a display of the virtual version of the remote control at the subscriber location including highlighting or illustrating any recommended action performed from a location that is different than the subscriber location.

\* \* \* \* \*